US012282690B1

(12) United States Patent
Kantharaju et al.

(10) Patent No.: US 12,282,690 B1
(45) Date of Patent: Apr. 22, 2025

(54) ENABLE BOOT ON A NON-VOLATILE MEMORY EXPRESS SOFTWARE REDUNDANT ARRAY OF INDEPENDENT DRIVES VOLUME

(71) Applicant: DELL PRODUCTS L.P., Round Rock, TX (US)

(72) Inventors: Nikhith Ganigarakoppal Kantharaju, Hassan (IN); Abhijit Mirajkar, Kolhapur (IN); Richa Kumari, Bangalore (IN); Ramesha He, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/404,501

(22) Filed: Jan. 4, 2024

(51) Int. Cl.
*G06F 3/06* (2006.01)

(52) U.S. Cl.
CPC ............ *G06F 3/0689* (2013.01); *G06F 3/061* (2013.01); *G06F 3/0658* (2013.01)

(58) Field of Classification Search
CPC ....... G06F 3/0689; G06F 3/061; G06F 3/0658
See application file for complete search history.

(56) References Cited

U.S. PATENT DOCUMENTS

| | | | |
|---|---|---|---|
| 7,263,582 B2 | 8/2007 | Vasudevan et al. | |
| 11,467,780 B1* | 10/2022 | Perez Guevara | G06F 3/0653 |
| 2007/0294582 A1 | 12/2007 | Rangarajan et al. | |
| 2016/0259588 A1 | 9/2016 | Vellimalai et al. | |
| 2017/0269857 A1 | 9/2017 | Kundu et al. | |
| 2017/0293448 A1* | 10/2017 | Bolen | G06F 3/061 |
| 2018/0095679 A1* | 4/2018 | Wysocki | G06F 3/0689 |
| 2020/0104140 A1* | 4/2020 | Liu | G06F 3/0604 |
| 2021/0173575 A1* | 6/2021 | Thenmalaikaan Abdul Jabbar .... G06F 3/0683 |
| 2022/0027165 A1* | 1/2022 | Juan | G06F 21/572 |
| 2024/0168772 A1* | 5/2024 | Song | G06F 9/48 |

* cited by examiner

*Primary Examiner* — Jason W Blust
(74) *Attorney, Agent, or Firm* — Larson Newman, LLP

(57) ABSTRACT

A system claims ownership of a shared mailbox, and configures the shared mailbox as a redundant array of independent drives (RAID) controller. The system creates a RAID volume from at least one non-volatile memory express drive, and exposes the RAID volume during a boot process to a basic input/output system.

20 Claims, 6 Drawing Sheets

ENABLE BOOT ON A NON-VOLATILE MEMORY EXPRESS SOFTWARE REDUNDANT ARRAY OF INDEPENDENT DRIVES VOLUME

FIELD OF THE DISCLOSURE

The present disclosure generally relates to information handling systems, and more particularly relates to enable boot on a non-volatile memory express software redundant array of independent drives volume.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system claims ownership of a shared mailbox, and configures the shared mailbox as a redundant array of independent drives (RAID) controller. The system creates a RAID volume from at least one non-volatile memory express drive, and exposes the RAID volume during a boot process to a basic input/output system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
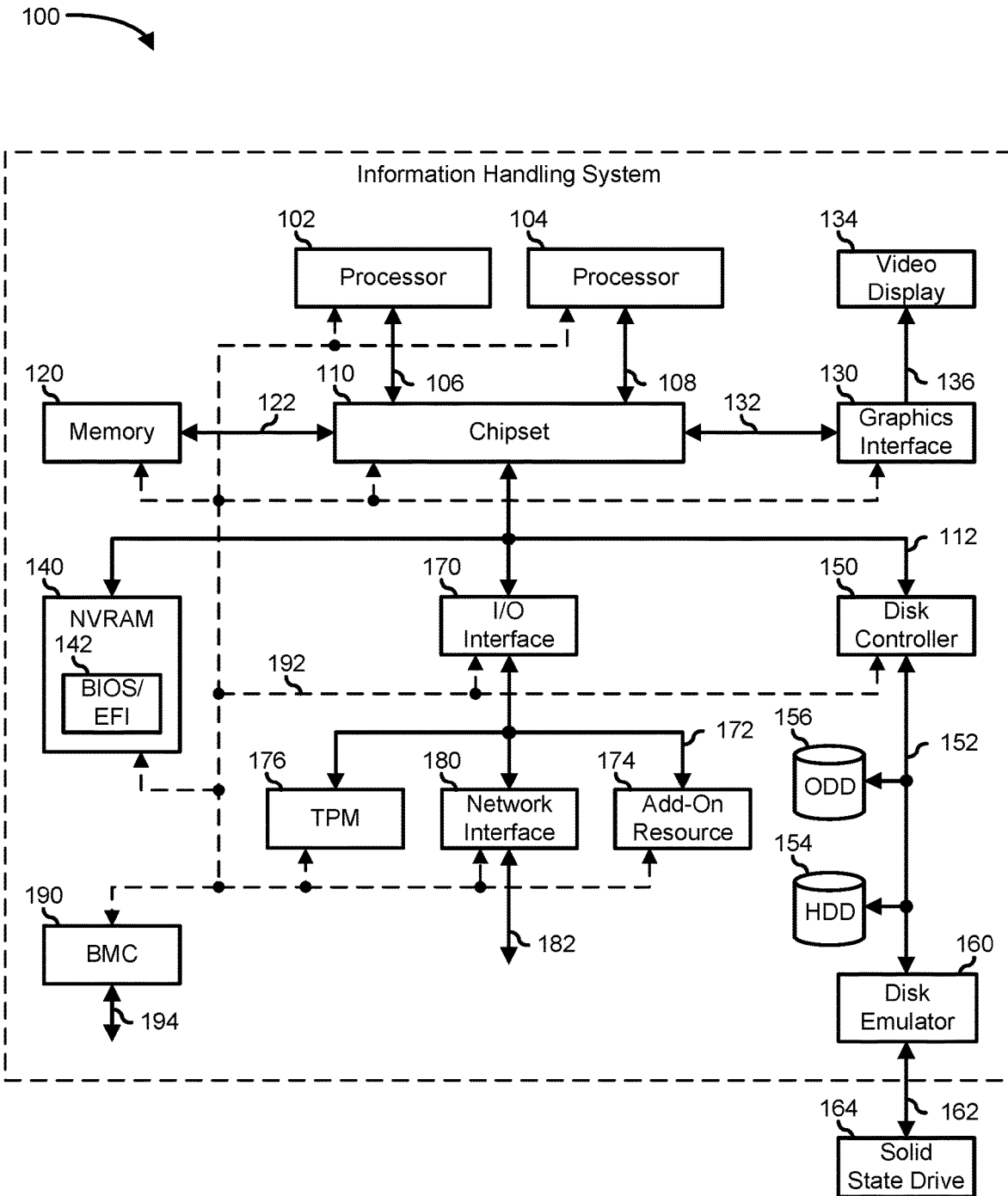
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed of within information handling system 100.

I/O interface 170 includes a peripheral interface 172 that connects the I/O interface to an add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100 and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated into another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional buses, not shown for clarity. For example, information handling system 100 can include multiple processor cores, audio devices, and the like. While a particular arrangement of bus technologies and interconnections is illustrated for an example, one of skill will appreciate that the techniques disclosed herein are applicable to other system architectures. Information handling system 100 can include multiple central processing units (CPUs) and redundant bus controllers. One or more components can be integrated. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Generally, software redundant array of independent drives (RAID) environments use a chipset SATA controller as a primary controller to manage the configuration and facilitate boot operations of a software RAID volume. Removal of the chipset SATA controller from upcoming platforms by manufacturers poses a challenge for software RAID users who rely on the chipset SATA controller to manage and facilitate the boot operations of their software RAID volumes. For example removal of the chipset SATA controller would disrupt the boot support and the management of the software RAID volumes, such as creating and deleting a RAID volume through a configuration interface. In addition, the ability to enable boot on the software RAID volume may also be removed. To address these and other concerns, the present disclosure provides a system and method to manage and facilitate the boot process of software RAID volumes without a dependency on the chipset SATA controller.

Figure 2:
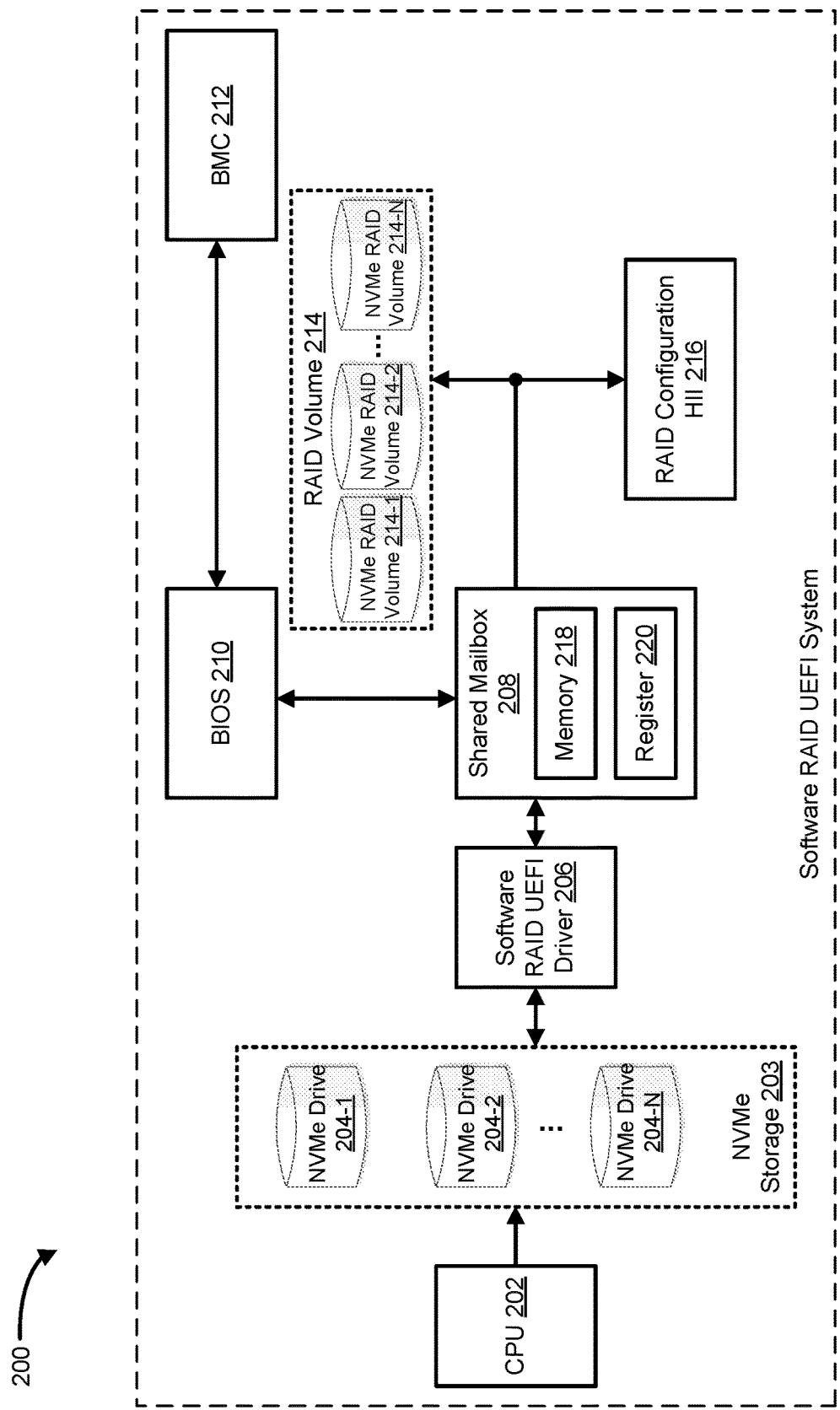
FIG. 2 is a block diagram of a software redundant array of independent drives (RAID) unified extensible firmware interface (UEFI) system for managing and booting a non-volatile memory express (NVMe) RAID volume, according to an embodiment of the present disclosure.

FIG. 2 illustrates a block diagram of a software RAID unified extensible firmware interface (UEFI) system 200 for managing and booting a non-volatile memory express (NVMe) software RAID volume. The software RAID UEFI system 200, also referred to herein simply as a system 200, may be a part of an information handling system similar to information handling system 100 of FIG. 1, and includes a CPU 202, an NVMe storage 203, a software RAID UEFI driver 206, a shared mailbox 208, a BIOS 210, a BMC 212, a RAID volume 214, and a RAID configuration human interface infrastructure (HII) 216. In one embodiment, BIOS 210 is similar to BIOS/EFI 142 of FIG. 1 while the BMC 212 is similar to BMC 190 of FIG. 1. The components of the system 200 may be implemented in hardware, software, firmware, or any combination thereof. The components shown are not drawn to scale and system 200 may include additional or fewer components. In addition, connections between components may be omitted for descriptive clarity.

The NVMe storage 203 may be a direct attached storage of the information handling system that includes at least one NVMe drive, SSD drive, or similar, wherein the SSD drive may be similar to SSD 164 of information handling system 100 of FIG. 1. In another embodiment, NVMe storage 203 may be a network attached storage, storage area network attached storage, etc. In this example, NVMe storage 203 includes NVMe drives 204-1, 204-2, through 204-N. Similarly, the RAID volume 214 may include at least one NVMe RAID volume. In this example, RAID volume 214 includes NVMe RAID volume 214-1, 214-2 through 214-N. Shared mailbox 208 includes a memory 218 and a register 220. The CPU 202, NVMe storage 203, software RAID UEFI driver 206, shared mailbox 208, BIOS 210, BMC 212, RAID volume 214, and RAID configuration HII 216 may be communicatively coupled to shared mailbox 208 and RAID volume 214. The system 200 may be implemented at the pre-operating system level of the information handling system. Although in this example, the system 200 does not include a dedicated storage controller, such as a SATA controller for booting the RAID volume 214, the system 200 may include a controller but may not utilize this controller to boot the RAID volume 214.

CPU 202 may be configured to control operations of various components of the information handling system, such as the NVMe storage 203, software RAID UEFI driver 206, shared mailbox 208, BIOS 210, BMC 212, RAID volume 214, and RAID configuration HII 216. In an embodiment, the CPU 202, which is similar to processors 102 and 104 of FIG. 1, may play a role throughout the operation of the system 200. For example, during the initialization and boot process, the CPU 202 may execute firmware instructions, initialize hardware components, including the shared mailbox 208, and may help facilitate an operation associated with NVMe storage 203, among others.

The NVMe storage 203 may be used to store and manage data. In one embodiment, the NVMe storage 203 may include at least one NVMe storage device, such as an NVMe drive, SSDs, or similar. NVMe storage 203 may use a storage protocol designed to access and transfer data in NVMe drives 204 via an NVMe passthrough interface. The NVMe passthrough interface may be leveraged by the software RAID UEFI driver 206 to discover available NVMe drives for the RAID volume 214 during the boot process. For example, the software RAID UEFI driver 206, also referred to herein simply as a RAID driver 206, may utilize the NVMe passthrough interface to read metadata from NVMe drives 204. The metadata may include information on whether a particular NVMe drive is included in RAID volume 214 and thus may be used to subsequently construct the RAID volume 214.

The RAID driver 206 may also be configured to attach RAID volume 214 under shared mailbox 208 and report RAID volume 214 to the BIOS. The RAID driver 206 may be a software/hardware component designed to manage and facilitate the operation of RAID volume 215. For example, the RAID driver 206 may control tasks such as RAID volume initialization, configuration, and boot support during the system's startup. In an embodiment, the RAID driver 206 may claim ownership of the shared mailbox 208 during the boot process and then mark the shared mailbox 208 as a primary or dedicated controller for RAID volume 214 to enable boot and/or configuration of RAID volume 214. Further, the RAID driver 206 may interact with the shared mailbox 208, install RAID protocols, and communicate with the BIOS 210 for hiding or unhiding the PCIe shared mailbox 208, among others.

During the driver load phase of the boot process, the RAID driver 206 may be configured to receive a supported, start, and stop callbacks on supported devices by opening a device path protocol. The supported callback may be transmitted for PCIe devices, such as the shared mailbox 208 to determine which of the PCIe devices are supported. The supported callback function may be transmitted using a vendor identifier and device identifier. If the shared mailbox 208 is supported, the RAID driver 206 may return a status of success. The RAID driver 206 may claim ownership of the shared mailbox 208 by returning the success status to the supported callback function. If the supported callback function is returned with the success status, then the UEFI core may transmit a start callback function for the shared mailbox 208 and may also install a device I/O protocol. The stop callback may be called during the unloading of the RAID driver 206.

The shared mailbox 208 may be configured as a shared communication interface, allowing data exchange between BIOS 210, BMC 212 during the boot process. The shared mailbox 208 may be a PCIe device, PCI device, or similar, wherein the shared mailbox 208 may provide mailbox features using at least one register and an internal shared memory, such as register 220 and memory 218, respectively. In particular, the shared mailbox 208 through memory 218 may be configured as a shared memory region that can enable different system components to leave messages or exchange data. For example, during the boot process, the shared mailbox 208 may facilitate communication between the BIOS 210 and BMC 212, such as to exchange data, system inventory information, etc. using a handle of the shared mailbox 208. The use of the handle may enable the boot of RAID volume 214 without a chipset SATA controller. The shared mailbox 208 may include a control interface allowing software components like the RAID driver 206 to interact with and control its behavior.

The shared mailbox 208 may be configured to be hidden/disabled or unhidden/enabled via BIOS 210. The shared mailbox 208 is typically available for enumeration and utilization of the BIOS 210 and the operating system when enabled or unhidden. Correspondingly, the shared mailbox 208 is typically not available for enumeration when disabled or hidden. Typically, the BIOS 210 enabled the shared mailbox 208 during the boot process. However, in instances where the shared mailbox 208 remains hidden and not used by the BIOS 210 or the BMC 212, the RAID driver 206 may enable the mailbox 208 by sending an "unhide request" to BIOS 210.

The BIOS 210 is a firmware component configured to initialize hardware and provide a basic interface for the operating system during the boot process. Further, the BIOS 210 may also be configured to exchange data with the BMC 212 using the PCIe shared mailbox 208 during a collect system inventory on restart (CSIOR) phase of the boot process. The CSIOR phase is a device inventory collection process that occurs during the boot process. After the CSIOR phase, the RAID driver 206 can claim ownership of the shared mailbox 208.

The BMC 212 may be a microcontroller that provides management and control functions for the information handling system, such as participating in data exchange during the CSIOR phase facilitated by the shared mailbox 208 and managing RAID volume 214. In an embodiment, the RAID driver 206 may be configured to not interfere with the existing functionalities of the BMC 212. For example, the RAID driver 206 may not alter memory 218 and/or register 220 as they may be in use in parallel during the CSIOR phase by the BIOS 210 and the BMC 212 for data exchange.

The RAID volume 214 may correspond to a logical storage entity created by combining multiple physical drives, such as one or more of the NVMe drives 204 into a single, virtualized unit. Such configuration may enhance performance, fault tolerance, or both, depending on the RAID level employed. The RAID volume 214 may exhibit efficient parallel I/O operations, for optimal utilization of the capabilities of the NVMe drives 204. In an embodiment, the RAID configuration HII 216 may be configured to provide an interface for user interaction and management of software RAID configurations within system 200. The RAID configuration HII 216 may provide advanced graphical elements and user-friendly controls allowing users to visualize and manipulate RAID arrays. For example, using the RAID configuration HII 216, users can drag and drop drives, create logical RAID volumes, and configure redundancy levels.

Those of ordinary skill in the art will appreciate that the configuration, hardware, and/or software components of system 200 depicted in FIG. 2 may vary. For example, the illustrative components within system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
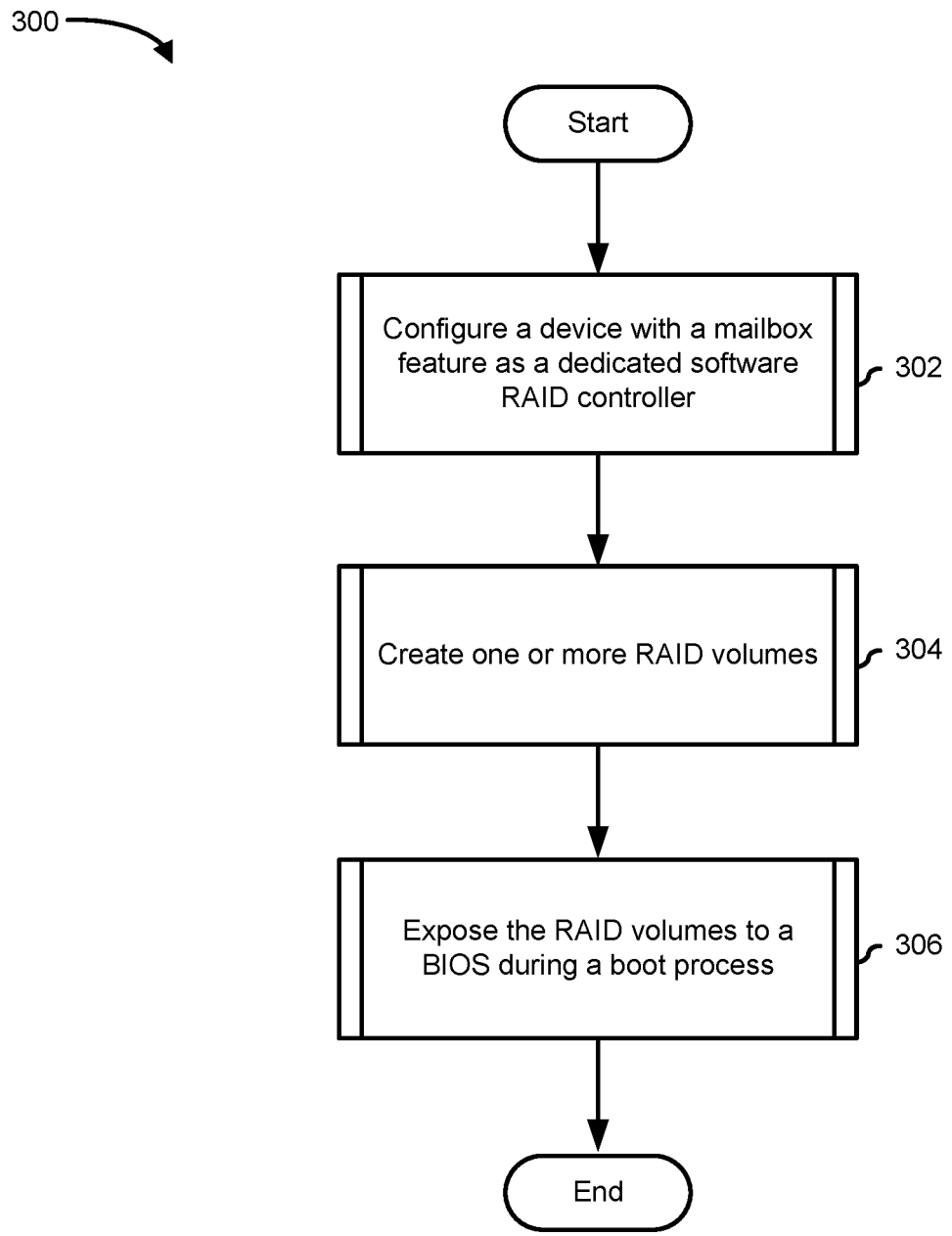
FIG. 3 is a flowchart of a method for booting an NVMe software RAID volume, according to an embodiment of the present disclosure.

FIG. 3 shows a flowchart of a method 300 for booting an NVMe software RAID volume. Method 300 may be performed by one or more components of system 200 of FIG. 2 during a boot process of an information handling system. For example, RAID driver 206 may perform one or more blocks of the method 300. While embodiments of the present disclosure are described in terms of system 200 of FIG. 2, it should be recognized that other systems may be utilized to perform the described method.

Method 300 typically starts at block 302, where a shared mailbox may be configured as a dedicated software RAID controller. The shared mailbox may be a PCIe device, PCI device, or similar device with a mailbox feature and an internal memory. The shared mailbox may be a non-storage class device that is not hot-swappable. For example, the shared mailbox may be part of a motherboard of the information handling system. Block 302 is illustrated in further detail in FIG. 4.

The method 300 may proceed to block 304, where at least one RAID volume may be created from one or more NVMe drives of the information handling system. Subsequent to creating the RAID volume(s), the method 300 may proceed to block 306 where the RAID volume(s) may be exposed to the BIOS and/or the operating system to enable the boot capability of the RAID volume(s). Thereafter, the method ends and exits the boot process. The blocks 304 and 306 are illustrated in further detail in FIG. 5.

Figure 4:
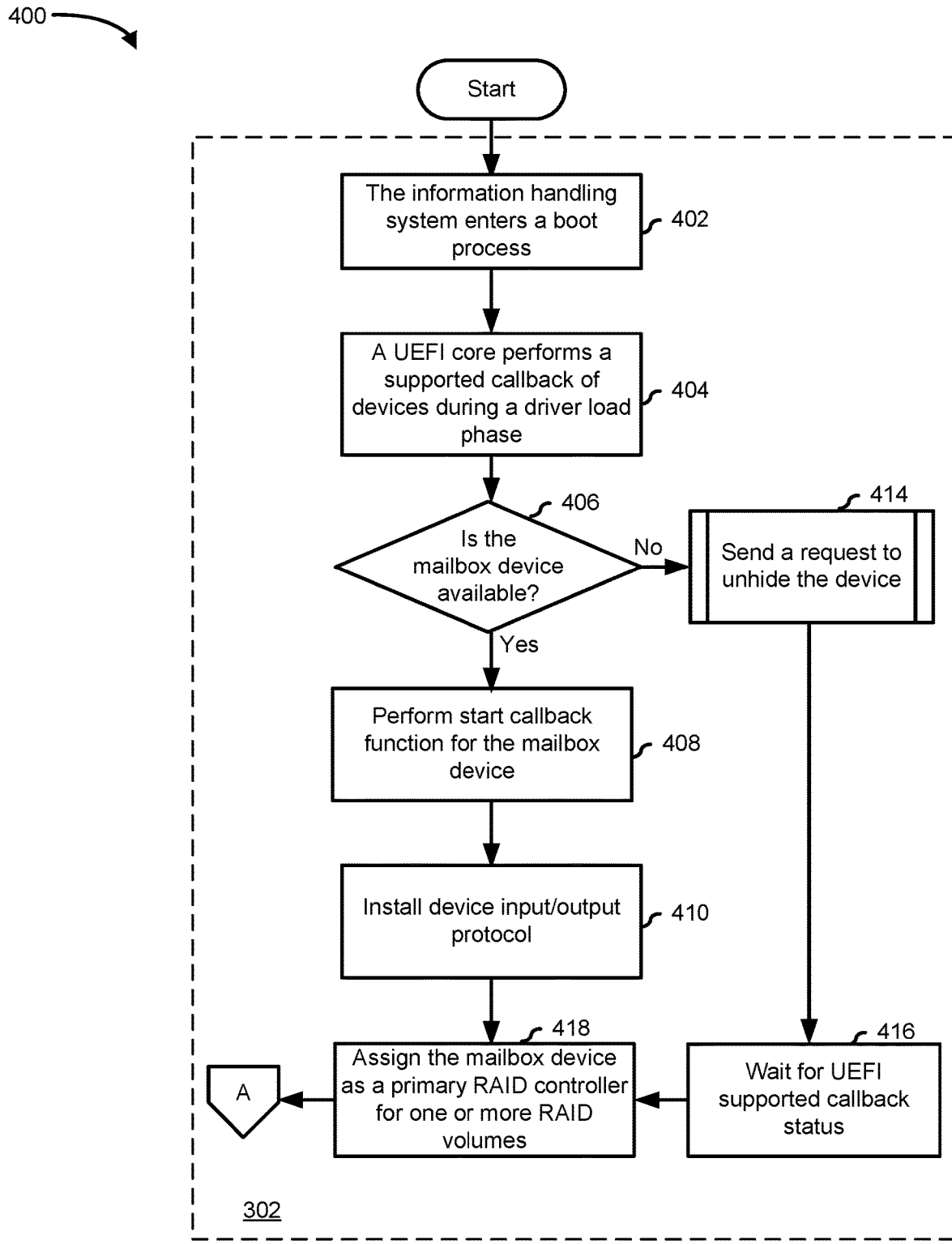
FIG. 4 and FIG. 5 are flowcharts of methods to enable boot of a software RAID volume, according to an embodiment of the present disclosure.
Figure 5:
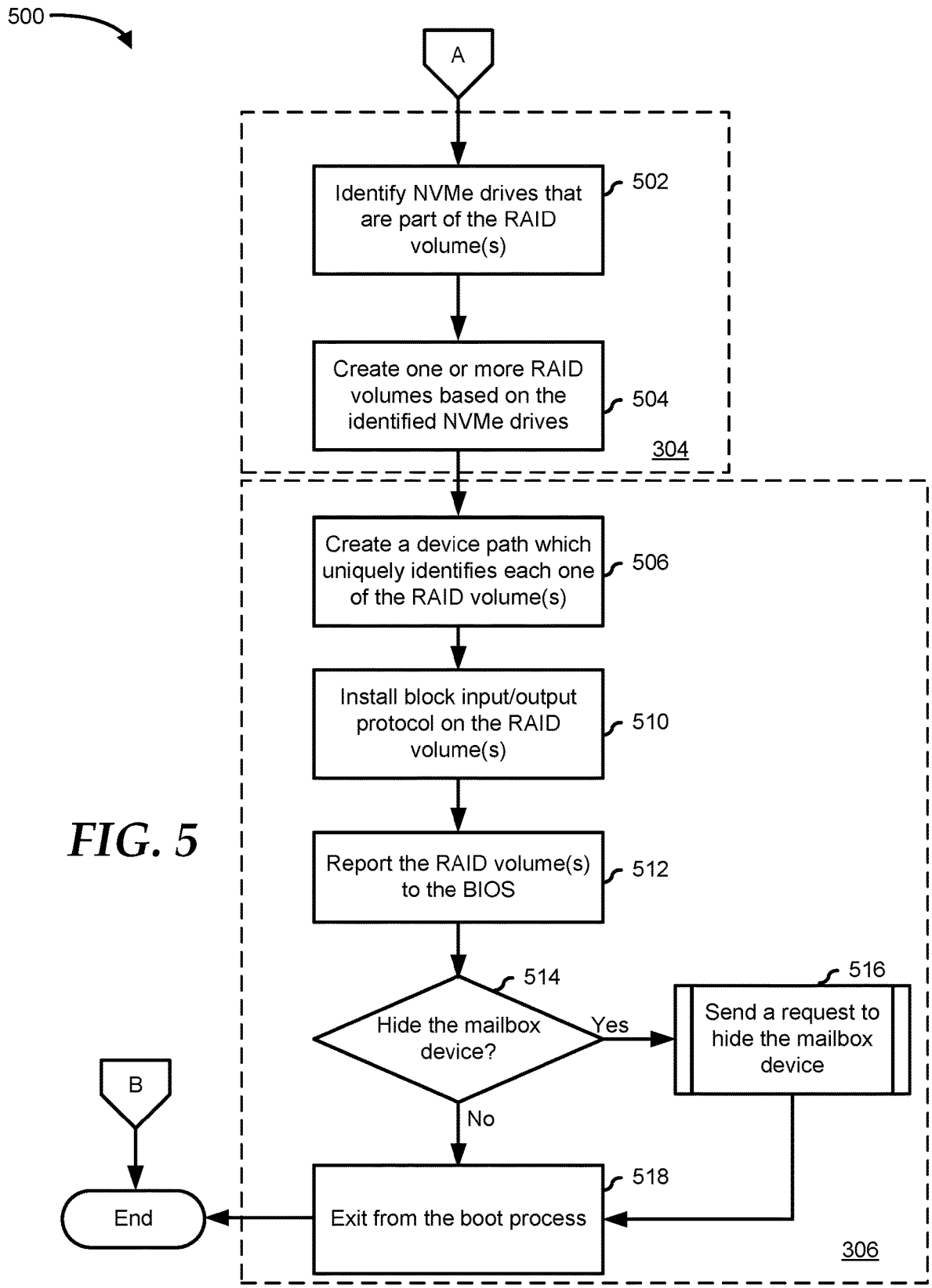

FIG. 4 and FIG. 5 show flowcharts of methods 400 and 500 respectively to enable boot of a software RAID volume of an information handling system without a chipset SATA boot controller. Methods 400 and 500 may be performed by one or more components of system 200 of FIG. 2. For example, at least one block of method 400 may be performed by RAID driver 206 of FIG. 2. While embodiments of the present disclosure are described in terms of system 200 of FIG. 2, it should be recognized that other systems may be utilized to perform the described method.

Method 400 typically starts at block 402 where the information handling system enters a boot process. The method proceeds to block 404, where a UEFI core may perform a "supported callback" function for each device, such as each PCIe device in the information handling system during a driver load phase or the driver execution environment phase of the boot process. The supported callback function may be performed using a vendor and device identifier of each device. This allows a device, such as a PCIe device, with a mailbox feature like the shared mailbox 208 to be identified. The RAID driver 206 may receive the supported callback function for the shared mailbox 208 from the UEFI core.

The method proceeds to decision block 406 where The RAID driver 206 may check whether the mailbox device 208 is available or not by checking with the BIOS 210. The mailbox device 208 is available when it is enabled or unhidden. If the shared mailbox 208 is available, then the "YES" branch is taken, and the method proceeds to block 408. If the shared mailbox 208 is not available, then the "NO" branch is taken, and the method proceeds to block 414. The RAID driver 206 may claim ownership of the shared mailbox by returning a "success" status to the support callback from the UEFI core when the mailbox 208 is available. At block 408, upon receipt of the claim of ownership by the RAID driver 206, the UEFI core can perform "start callback" function for the shared mailbox 208. The UEFI core may also install a device I/O protocol at the shared mailbox 208 at block 410.

At block 414, the RAID driver 206 may send a request to BIOS 210 to enable or unhide the shared mailbox 208 via an interface. The block 414 is illustrated in further detail in FIG. 6. Prior to sending the enable or unhide request, the RAID driver 206 may enable the interface between the RAID driver 206 and the BIOS 210. The interface would allow the RAID driver 206 and the BIOS 210 to communicate with each other. At block 416, the RAID driver 206 may wait for a UEFI-supported callback status from the shared mailbox 208. After receiving a status of "success," the method may proceed to block 418 where the RAID driver 206 may assign the shared mailbox 208 as the primary or dedicated controller of the RAID volume 214. During this process, the RAID driver 206 may not alter either the memory or register of the shared mailbox 208 that is in use by the BIOS 210 and/or the BMC 212. At block 418, the RAID driver 206 may mark or assign the shared mailbox 208 as a primary RAID controller of RAID volumes 214. The RAID driver 206 may then proceed to block 502 of method 500 of FIG. 5.

FIG. 5 shows a flowchart of a method 500 which is a continuation of method 400 of FIG. 4. The method 500 typically starts at block 502 where the RAID driver 206 may identify one or more NVMe drives from NVMe drives 204 that are part of RAID volume 214 by using a BIOS NVMe passthrough interface. For example, the RAID driver 206 may read metadata from the NVMe drives 204. The metadata may include information on whether the NVMe drive is included in the RAID volume 214. For example, the metadata may include configuration information, such as a map that indicates whether a particular NVMe drive, or a portion thereof is part of the RAID volume 214. The method 500 may proceed to block 504 where the RAID driver may create one or more RAID volumes, such as the RAID volume 214, based on the information from the metadata.

The method 500 then proceeds to block 506 where the RAID driver 206 may create a device path for the RAID volume 214 under the PCIe shared mailbox 208. The device path may serve as a unique identifier for each RAID volume and establish the communication pathway between the operating system and the RAID configuration. The method 500 proceeds to block 510 where the RAID driver 206 may also install block I/O protocol on the RAID volume 214. The device path and the block I/O protocol may expose the RAID volume 214 to the boot process and thereafter report the RAID volumes to the BIOS 210 and the operating system at block 512.

The method 500 may proceed to decision block 514 where the RAID driver 206 may determine whether to send a request to disable or hide the shared mailbox 208 before loading the operating system. For example, the RAID driver may check if a disable flag is set to "TRUE." If the RAID driver 206 determines to send a request to disable the shared mailbox 208, then the "YES" branch is taken, and the method proceeds to block 516 to send a request to hide the shared mailbox. The block 516 is illustrated in further detail in FIG. 6. If the RAID driver 206 determines to not disable the shared mailbox 208, then the "NO" branch is taken, and the method proceeds to block 518. At block 518, the information handling system may continue with the boot process and subsequently finish, exiting the boot process. Once the boot process is done, the operating system can access the RAID volume 214. The method 500 may end.

Figure 6:
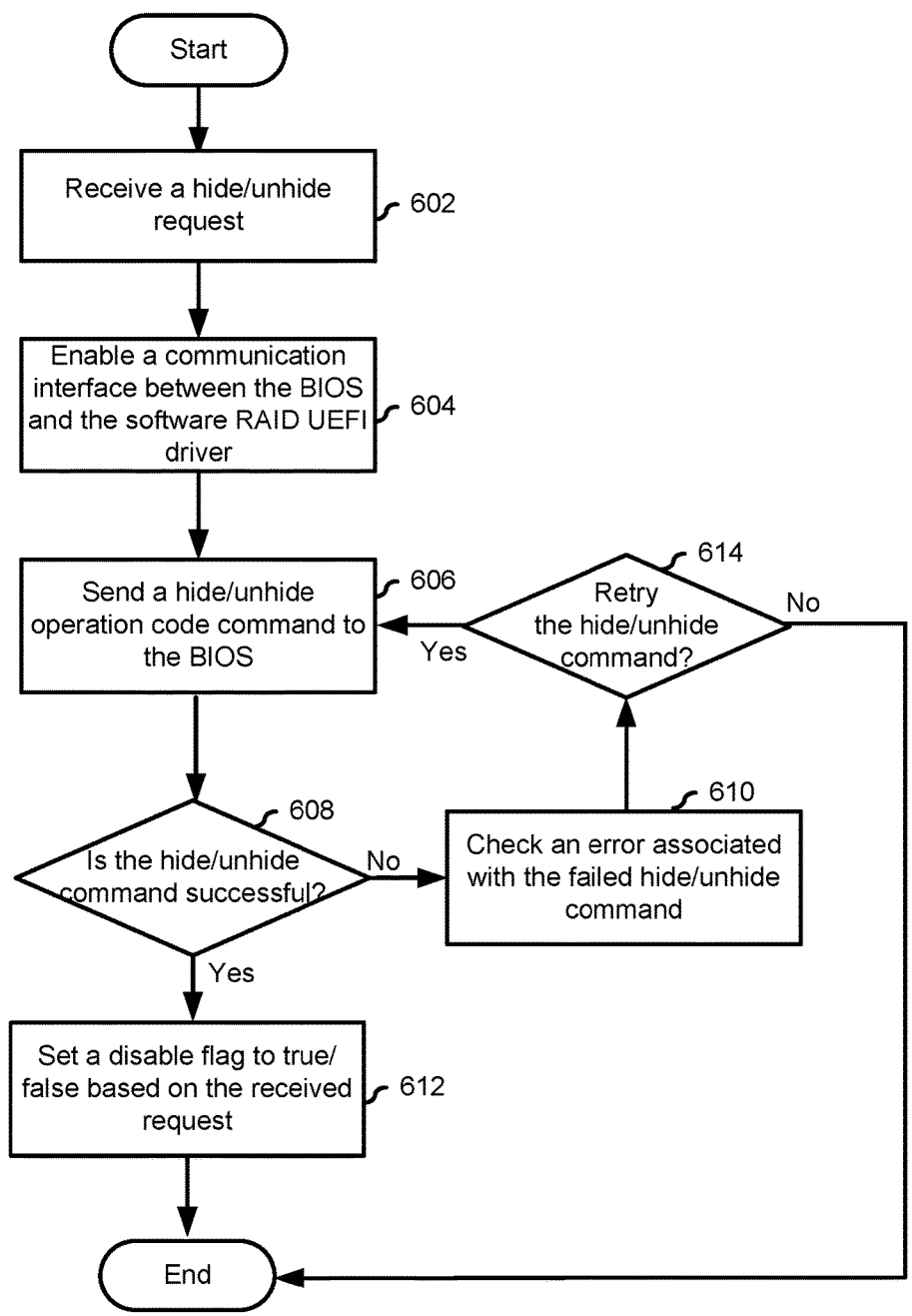
FIG. 6 shows a flowchart of a method of hiding or unhiding a shared mailbox, according to an embodiment of the present disclosure.

FIG. 6 shows a flowchart of a method 600 of hiding or unhiding a shared mailbox. The method 600 may be performed by one or more components of the system 200 of FIG. 2. Method 600 may be performed by one or more components of system 200 of FIG. 2. For example, at least one block of method 600 may be performed by the BIOS 210 of FIG. 2. While embodiments of the present disclosure are described in terms of system 200 of FIG. 2, it should be recognized that other systems may be utilized to perform the described method.

The method 600 typically starts at block 602 where the BIOS 210 may receive the hide or unhide request from the RAID driver 206. At block 604 the RAID driver 206 may enable a BIOS interface between itself and the BIOS 210. The BIOS interface allows the BIOS 210 and the RAID driver 206 to communicate. Upon enabling the interface, at block 606, the RAID driver 206 may send a BIOS-specific command to the BIOS 210 to hide or unhide the shared mailbox 208, based on the request received from the method 400. For example, the RAID driver 206 may send an operation code to enable or unhide the shared mailbox 208 to the BIOS 210 when an enable or unhide request is received. Typically, the request to enable the mailbox 208 may be received if shared mailbox 208 is used or unavailable, such as hidden by the BIOS 210. The hide request may be sent after the RAID driver 206 has claimed ownership of the shared mailbox 208 and the RAID volume 214 was created.

The method 600 proceeds to decision block 608 where the RAID driver 206 may determine whether the hide or unhide command is successful when the command was executed. The RAID driver 206 may check whether the command was completed successfully using a returned status. For example, the status may say "success" if the hide or unhide command was successful. Accordingly, if the status includes an error message and/or an error code, then the hide or unhide command was not successful. If the command is successful, then the "YES" branch is taken, and the method proceeds to block 612. If the command is unsuccessful then the "NO" branch is taken, and the method proceeds to block 610.

At block 610, the RAID driver 206 may check the error message and/or error code from the execution of hide/unhide command. The method 600 proceeds to decision block 614 where it may determine whether to retry the hide/unhide command. The decision may be based on the error message and/or error code. For example, if the error message and/or error code is associated with a non-critical error code, then the method 600 may retry the hide/unhide command. Otherwise, if the error is critical, the method 600 may end. In another example, if the method 600 has tried the hide/unhide command below a pre-determined threshold, then the method may retry the hide/unhide command. Otherwise, the method 600 may end. If it is determined that the method 600 may retry the hide/unhide command, then the "YES" branch is taken, and the method loops back to block 606. If it is determined that the method 600 may not retry the hide/unhide command, then the "NO" branch is taken, and the method ends.

At block 612, the RAID driver 206 may set a disable flag to true or false based on the received request from the RAID driver 206. The disable flag may be a binary variable that can be used to keep track on whether to disable the shared mailbox 208 or not. For example, if the request to enable/unhide the shared mailbox 208 was received from the RAID driver 206, then the flag may be set to "1" or "TRUE." If a request to disable/hide the shared mailbox 208 was received from the RAID driver, then the flag may be set to "0" or "FALSE." After setting the disable flag, the method ends.

In an embodiment, the disclosed system and method (hereafter together referred to as a mechanism) may enable boot of a RAID volume without relying on a chipset SATA controller. Further, the disclosed mechanism provides compatibility with emerging server technologies by addressing the impending obsolescence of the chipset SATA controller in upcoming server platforms and ensuring continued support for RAID volumes. The disclosed mechanism is cost-effective and hardware-agnostic since it leverages a device in the server. Thus, eliminating the need for additional hardware.

As used herein, a hyphenated form of a reference numeral refers to a specific instance of an element and the un-hyphenated form of the reference numeral refers to the collective or generic element. Thus, for example, NVMe drive "204-1" refers to an instance of an NVMe drive class, which may be referred to collectively as NVMe drive "204" and any one of which may be referred to generically as an NVMe drive "204." In addition, for purposes of this disclosure, extensible firmware interface (EFI) and unified EFI (UEFI) are used interchangeably and called UEFI for simplicity. Also, as used herein, legacy BIOS, as well as UEFI BIOS, are referred to as BIOS for simplicity.

Although FIGS. 3-6 show example blocks of methods 300, 400, 600, and 600 in some implementations, methods 300-600 may include additional blocks, fewer blocks, different blocks, or differently arranged blocks than those depicted in FIGS. 3-6. Those skilled in the art will understand that the principles presented herein may be implemented in any suitably arranged processing system. Additionally, or alternatively, two or more of the blocks of methods 300-600 may be performed in parallel. For example, blocks 408 and 410 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   claiming, by a processor, ownership of a shared mailbox;
   configuring the shared mailbox as a redundant array of independent drives (RAID) controller;
   creating a RAID volume from at least a non-volatile memory express drive; and
   exposing the RAID volume during a boot process to a basic input/output system (BIOS).

2. The method of claim 1, wherein the shared mailbox is a peripheral component interconnect express device.

3. The method of claim 1, wherein the shared mailbox includes a memory and a register.

4. The method of claim 1, further comprising if the shared mailbox is not available, then sending a request to enable the shared mailbox to the BIOS.

5. The method of claim 1, further comprising subsequent to the exposing of the RAID volume to the BIOS, disabling the shared mailbox.

6. The method of claim 1, further comprising enabling an interface between a RAID driver and the BIOS.

7. The method of claim 1, further comprising installing a block input/output protocol on the RAID volume.

8. The method of claim 7, wherein the non-volatile memory express drive is a direct-attached storage.

9. An information handling system, comprising:
   a processor; and
   a memory storing instructions that when executed cause the processor to perform operations including:
      claiming ownership of a shared mailbox;
      configuring the shared mailbox as a redundant array of independent drives (RAID) controller;
      creating a RAID volume from at least one non-volatile memory express drive; and
      exposing the RAID volume during a boot process to a basic input/output system (BIOS).

10. The information handling system of claim 9, wherein the shared mailbox is a peripheral component interconnect express device.

11. The information handling system of claim 9, wherein the shared mailbox includes a memory and a register.

12. The information handling system of claim 9, wherein the operations further comprise if the shared mailbox is not available, then sending a request to enable the shared mailbox to the BIOS.

13. The information handling system of claim 9, wherein the operations further comprise subsequent to the exposing of the RAID volume to the BIOS, disabling the shared mailbox.

14. The information handling system of claim 9, wherein the operations further comprise enabling an interface between a RAID driver and the BIOS.

15. A non-transitory computer-readable medium to store instructions that are executable to perform operations comprising:
   claiming ownership of a shared mailbox;
   configuring the shared mailbox as a redundant array of independent drives (RAID) controller;
   creating a RAID volume from at least one non-volatile memory express drive; and
   exposing the RAID volume during a boot process to a basic input/output system (BIOS).

16. The non-transitory computer-readable medium of claim 15, wherein the shared mailbox is a peripheral component interconnect express device.

17. The non-transitory computer-readable medium of claim 15, wherein the shared mailbox includes a memory and a register.

18. The non-transitory computer-readable medium of claim 15, wherein the operations further comprise if the shared mailbox is not available, then sending a request to enable the shared mailbox to the BIOS.

19. The non-transitory computer-readable medium of claim 15, wherein the operations further comprise subsequent to the exposing of the RAID volume to the BIOS, disabling the shared mailbox.

20. The non-transitory computer-readable medium of claim 15, wherein the operations further comprise enabling an interface between a RAID driver and the BIOS.

\* \* \* \* \*